3,484,247
CONVERSION OF GREEN TEA USING OZONE
Harold Nathaniel Graham, Englewood, and Victor Vernon Studer, Mountain Lakes, N.J., and Martin Gurkin, Bardonia, N.Y., assignors to Thomas J. Lipton, Inc., Englewood Cliffs, N.J., a corporation of Delaware
No Drawing. Filed July 3, 1967, Ser. No. 650,582
Int. Cl. A23f 3/00
U.S. Cl. 99—76          13 Claims

ABSTRACT OF THE DISCLOSURE

Green tea is converted to black tea by heating an aqueous solution of green tea solids at a pH above about 6.0 in the presence of ozone.

---

This invention relates to tea and tea extracts and to processes for preparing the same. More particularly, the invention relates to a novel process of converting extracts of tea, such as green tea, to oxidation products thereof, such as black tea.

Green tea, as the term is employed herein includes freshly gathered tea leaves, tea leaves which have been freshly gathered and dried immediately, tea leaves which have been heat-treated before drying to inactivate the enzymes therein, and aqueous extracts of these leaves. In each instance, the green tea has undergone substantially no fermentation to the "black" state.

Black tea, on the other hand, is usually prepared by subjecting freshly picked tea leaves to a series of processing conditions including the withering and rolling of freshly harvested leaves, followed by a fermentation step (enzymic oxidation) during which the characteristic color, flavor and aroma of black tea are developed. The fermentation is stopped after a suitable period of time, the tea leaves are "fired" to inactivate the enzymes causing the fermentation and the tea is dried. The extent of fermentation varies, in commercial practice, from black to various gradations between green and black. Partially fermented teas are known as "oolong" teas. The green, oolong, and black teas have distinctive flavor and color characteristics.

The fermentation processes are generally carried out at or near the tea growing areas and the fermentation conditions vary with local custom and climatic conditions. As a result, the fermented teas of commerce vary greatly in color and quality of flavor, depending upon the area of the world in which they are produced and the conditions of processing. A means for standardizing or at least insuring the production of a uniform quality of fermented black tea and of partially fermented varieties from a given green tea has long been sought.

It has been proposed to convert green tea to black tea by artificial means and methods, for example, by treating an extract of the green leaf with a catalyst such as potassium permanganate at a temperature as high as about 90° C. for a period of time ranging as long as about six hours, as disclosed in U.S. Patent 2,863,775. As far as we are aware, however, such method has never attained commercial significance.

Another method proposed for converting green tea extracts to black tea involves the use of fresh green tea leaves still containing their natural enzymes by adding such fresh leaves to an aqueous extract of green leaf thereby to convert the latter to black tea. Such procedures are disclosed and claimed in the Seltzer et al. Patent 2,975,057.

It is an object of the present invention to provide a process whereby black and partially converted teas can be prepared from manufactured green tea under closely controlled conditions.

Another object of the invention is to produce teas of varying degrees of color and flavor from green tea extracts.

Another object of the invention is to convert green teas at temperatures higher than those at which normal fermentations can occur.

Still another object of the invention is to effect the conversion of green teas in shorter periods of time and under conditions which produce uniform quality in the final product, even when teas from a variety of sources are used.

Another object of the invention is to produce black tea from green teas which would not normally be suitable for use in standard black tea fermentations because of low enzyme activity or the lack of certain constituents required for standard fermentation.

It is another object of the invention to bring about the conversion of green tea without the use of enzymes which become inactivated by heating.

Still another object of the invention is to develop a process of converting green tea products which readily lends itself to continuous operations.

Another object of the invention is to produce an instant black tea directly from green tea without the necessity of carrying out the additional processing steps (such as firing and drying) required for the manufacture of commercial black tea.

In accordance with the present invention, by which the foregoing objects are realized, the water-soluble constituents of green tea, which may be an aqueous extract of green tea, are heated in the presence of water and ozone at a pH above 6. The ozone is introduced in a stream of gas, preferably air. Under the conditions prevailing, the reaction between the ozones and the water-soluble constituents of the green tea is allowed to progress until a desired amount of conversion of green tea to black tea has taken place. It is important to note that the conversion is nonenzymic, that is, it will take place with none of the active natural leaf enzyme present.

Although the pH of the solution is important in obtaining the objectives of the invention, other conditions are also to be considered, such as the temperature, the amount of ozone in the gas and in the solution, the time, agitation of the reaction system, and the concentration of the tea solids in the aqueous system. These and other features of the invention will be discussed in the following description.

The following examples illustrate how the invention may be carried out. The percentages expressed are on a weight basis unless otherwise indicated.

EXAMPLE 1

A hot water extract of commercial Japan green tea was prepared containing 4.8 percent soluble tea solids and was placed in an open steam-jacketed kettle equipped with a perforated circular tube for gas sparging. The solution, at 60° C. and an initial pH of 5.3, was made slightly alkaline by adding, with agitation, 4% potassium hydroxide (tea solids basis) as a 45% solution. This increased the pH of the solution to 7.5. While vigorously agitating at a temperature of 70° C., an ozone-air mixture was sparged through the tea extract at a rate of 31.3 liters per minute per pound of tea solids. The concentration of ozone in the air sparge was 22.3 mg. per liter. After 28 minutes of sparging, and 3 minutes additional purging with air (at which time the pH of the solution had decreased to 5.4), the tea solution was cooled to 60° C. 2.4% $CaCl_2 \cdot 2H_2O$ (tea solids basis) was then added and the insoluble material removed by centrifuging (at 6,700 times gravity) at 60° F. This is referred to as "dehazing" and is disclosed and claimed in the Schroeder Patent 2,891,866. The overall yield was 91% based on the amount of green tea soluble solids before treatment.

This "converted" green tea solution, now the color of a black tea extract at a similar tea solids concentration, was concentrated under vacuum to a solids content of 45%. A quantity of maltodextrins equal to the tea solids present was added and a portion of the material was vacuum drum dried. The resulting product when dissolved in water at beverage strength, had the flavor of black tea and a color similar to a regular tea beverage from a high quality commercial black tea leaf. The solubility of the powder and the clarity of the solution at beverage strength in cold, hard water were excellent.

Portions of the "converted" green tea concentrate containing maltodextrins described above, were mixed at levels of 25, 35 and 50% with 75, 65 and 50%, respectively, of a similar concentrate containing maltodextrins prepared from an extract of black tea leaf. These concentrate mixes were vacuum drum dried to give powders having satisfactory solubility and clarity in cold, hard water and color and flavor similar to a high quality beverage made from commercial black tea. The color and clarity of the blended and unblended products are summarized in Table I.

TABLE I

| Tea Products | Klett color | Clarity index |
| --- | --- | --- |
| 100% converted green | 206 | 12 |
| 50% converted green and 50% commercial black | 226 | 7 |
| 35% converted green and 65% commercial black | 224 | 6 |
| 25% converted green and 75% commercial black | 230 | 4.5 |
| 100% commercial black | 240 | 5.5 |

Color was measured in a Klett Colorimeter by preparing a 0.14% solution of instant tea (0.07% tea solids) in a buffer solution (0.944% $NaH_2PO_4 \cdot H_2O$; 0.858% $Na_2HPO_4 \cdot 7H_2O$) at pH 6.4 and at 25° C. A 420 millimicron light filter was used. The instrument is calibrated against a dichromate standard.

Clarity was measured in a 0.7% solution of instant tea (0.35% tea solids) in synthetic hard water, at 13° C., using a Klett Colorimeter with a 660 millimicron light filter. The synthetic hard water contained 0.0179% $CaCl_2 \cdot 2H_2O$, 0.015% $MgSO_4$ and 0.0062% $NaHCO_3$. After the measurement was made, the sample was centrifuged at 2000 times gravity and the absorbance was determined using the same filter. The difference between the two readings in Klett units is the clarity index. In every case the clarity values of solutions made up with soft water are substantially lower (i.e., clearer) than those made with hard water.

EXAMPLE 2

To demonstrate the effect of different pH's and different sources of green tea, the following procedures were carried out:

5% aqueous solution of freeze-dried extracts of green tea (from two different sources) were prepared and aliquots containing 25 grams of green tea (as dissolved tea solids) were placed into a 3-neck 1 liter round bottom flask connected to an ozonator (Welsbach Ozonator #T23). Reaction temperatures were maintained at 70° C. ±3° C. by immersion in a constant temperature water bath. The quantity of ozone generated at 100 volts was dependent on the rate of air flow through the ozonator. With an air flow of 1.7 liters per minute, 23 mg. of ozone per liter of air were generated. With an air flow rate of 3.96 liters per minute, 12.4 mg. of ozone per liter of air were generated. The ozone/air mixture was sparged through the alkali-treated green tea solutions until 0.97 gram of ozone (0.039 gram of ozone per gram of tea solids) had been added. After treatment, the pH of the solution was adjusted to 5.5 (when necessary) and then dehazed and freeze-dried. The results are presented in the following table.

TABLE II

| | Air/ozone flow rate (l/min.) | | | | | | |
| --- | --- | --- | --- | --- | --- | --- | --- |
| | 1.70 | | | | | 3.96 | |
| Test number | 1 | 2 | 3 | 4 | 5 | 6 | 7 |
| Percent KOH added initially | 0 | [2]3.5 | [2]4.5 | [1]4.8 | [1]14.4 | [2]3.5 | [2]4.5 |
| pH after KOH addition | 5.2 | 6.7 | 7.1 | 7.2 | 8.9 | 7.1 | 7.4 |
| pH after treatment | 4.3 | 5.5 | 5.9 | 5.5 | 6.8 | 5.8 | 6.2 |
| Treatment time (min.) | 25 | 25 | 25 | 25 | 25 | 20 | 20 |
| Yield, percent | 92.0 | 100 | 100 | 100 | 100 | 100 | 100 |
| Klett color | 210 | 296 | 340 | 319 | 700 | 212 | 328 |

[1] Green tea extract of Lipton's commercial blend.
[2] Green tea extract of Japanese green tea siftings.

The results indicated that a pH higher than that of normal tea solutions is required in order to obtain an appreciable conversion of green tea to black tea. At the highest pH levels (8.9, obtained by adding 14.4% KOH) the air/ozone converted product had a very deep color (Klett value 700) and a high degree of redness when diluted with an equal amount of water. The products which were obtained at lower levels of KOH addition had acceptable colors and a hue similar to commercial instant teas. In test No. 1 the pH was adjusted upwardly by KOH addition. In test No. 5 the pH was lowered to the desired value by the addition of ion exchange resin. In all of the tests except No. 1 and No. 5, the pH of the converted solution was so close to the desired value (about 5.5) that it was not necessary to add either KOH or ion exchange resin to the product. With the ozone conversion of green tea, therefore, it will be noted that the need for neutralization can be eliminated, thus simplifying commercial operations. Increasing the rate of gas flow to 3.96 liters per minute resulted in a lowered degree of conversion with equivalent amounts of ozone and KOH. This is believed to be due to the less efficient contact between the larger gas bubbles formed, and the consequent less efficient mass transfer.

A process similar to that described in test No. 3, Example 2 was carried out in which only air (no ozone) was sparged at a rate of 0.036 l./min./g. of tea solids through a 5% solution of green tea solids at 70° C. and a pH of 7.3 (4.5% KOH added). The product obtained by the latter process was much lighter in color (Klett color 128) than the product obtained in Example 2. Thus, the presence of a small amount of ozone in the air stream greatly increases the efficiency of conversion of green tea to black tea.

To demonstrate that heat alone (without ozone) will not cause conversion, an experiment was conducted in which a 5% solution of extract solids from Japanese green tea was adjusted to a pH of 8.8 by the addition of 9.5% KOH and heated to 100° C. for 40 minutes without ozone or air addition and with nitrogen blanketing and sparging to insure complete exclusion of oxygen. The pH of the solution decreased to only 8.5 during the reaction. It was then adjusted to pH 5.5 with cation exchange resin and the resulting solution dehazed and freeze-dried. The color of the product indicated that essentially no color conversion occurred during this treatment; nor was there any significant alteration of the green tea flavor and taste.

The amount of ozone used is dependent on the other conditions and variables, particularly the pH, and also the type of green tea used, the concentration of the tea solids, the amount of color development desired, etc. Generally, at least 1% by weight of ozone based on tea solids is used. Normally, the concentration of the ozone in the gas stream should be within the range of 1 to 2% by volume. Oxygen can also be used as the gas stream in which ozone is introduced to the tea system.

In producing any product having particularly desired properties, the pH is especially important and, as indicated above should be above 6.0. Preferred results are obtained above about 6.5. The time of treatment is interdependent with other conditions, such as the type of tea used, the concentration of the tea solids in the solution, the concentration of ozone in the sparging gas, and the temperature. The temperature is selected to obtain conversion within feasible times and to obtain the degree of conversion desired. Generally, temperatures within the range of about 50–120° C. are satisfactory. Above 100° C., the system must, of course, be maintained under pressure. Preferred temperatures are in the range of 60–100° C. Higher temperatures or longer times of reaction generally produces a greater degree of conversion to a black tea product. Larger amounts of ozone generally produce more rapid conversion, or conversion at lower temperature or in a shorter time. When the process is carried out using higher concentrations of tea solids, then greater amounts of ozone, higher temperatures, greater amounts of alkali (or possibly all three conditions), or other conditions discussed herein may be required to effect a desired degree of conversion.

The source of the green tea used as starting material is a factor to consider in selecting the conditions for conversion. One green tea may require a somewhat different combination of pH, ozone concentration in the sparging gas, temperature and time, etc. than another green tea. A partially fermented tea, such as an "oolong" tea may be used as a starting material. It is also possible to blend teas from different sources in order to promote uniformity of the product obtained.

If desired, the conversion may be carried out in the presence of green leaf to effect a single stage extraction and conversion to give an infusion of black tea solids. This extract can then be separated from the leaf and processed to a black instant tea as described above.

Instead of potassium hydroxide other edible alkalies may be used for increasing the pH for conversion.

The ion exchange resins, as indicated above, are preferred for reducing the pH of the converted tea solution when necessary, because they are easily separated from the solution. Electrodialysis techniques, if desired, are also suitable. Other food grade neutralizing agents may be used, such as well-known food grade acids.

We claim:

1. The process of converting green tea to black tea which comprises heating an aqueous solution of solids of said green tea at a pH above 6.0 in the presence of ozone, and allowing said green tea solution to react with said ozone for a period of time sufficient to oxidize said green tea solids thereby producing black tea.

2. The process of converting constituents of green tea to a black tea which comprises heating said constitutents in the presence of water and ozone at a pH above about 6.0, and allowing said constituents to react with said ozone for a period of time sufficient to convert said constituents to constituents of black tea.

3. The process of claim 2 in which the pH is above 6.5.

4. The process of claim 3 in which the ozone is introduced to said solution in a stream of air.

5. The process of claim 3 in which the temperature is between about 50° C. and 120° C.

6. The process of claim 3 in which the temperature is between about 60° C. and 100° C.

7. The process of claim 3 in which the pH of the converted green tea solution is adjusted to pH below 6.0.

8. The processe of claim 2 in which the process is carried out in the presence of tea leaves.

9. The process of claim 1 in which the converted green tea is dried to produce an instant tea.

10. The process of converting constituents of partially fermented tea to a black tea which comprises heating said constituents in the presence of water and ozone at a temperature above about 50° C. and at pH above 6.0, and allowing said constituents to react with said ozone for a period of time sufficient to convert said constituents thereby producing black tea.

11. The process of claim 10 in which the ozone is introduced to said solution in a stream of air.

12. The process of converting constituents of green tea to a product equivalent to partially fermented tea, which comprises heating said constituents in the presence of water and ozone at a temperature above about 50° C. and at pH above 6.0, and allowing said constituents to react with said ozone for a period of time sufficient to convert said constituents to constituents of partially fermented tea.

13. The process of claim 12 in which the ozone is introduced to said solution in a stream of air.

References Cited

UNITED STATES PATENTS

| | | | |
|---|---|---|---|
| 2,975,057 | 3/1961 | Seltzer et al. | 99—77 |
| 3,163,539 | 12/1964 | Barch | 99—77 |
| 3,369,906 | 2/1968 | Chen | 99—77 |

RAYMOND N. JONES, Primary Examiner

J. R. HOFFMAN, Assistant Examiner

U.S. Cl. X.R.

99—77